US011313976B2

(12) United States Patent
Otaki et al.

(10) Patent No.: US 11,313,976 B2
(45) Date of Patent: Apr. 26, 2022

(54) HOST VEHICLE POSITION ESTIMATION DEVICE

(71) Applicant: TOYOTA JIDOSHA KABUSHIKI KAISHA, Toyota (JP)

(72) Inventors: Sho Otaki, Yokohama (JP); Ryuji Funayama, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 201 days.

(21) Appl. No.: 16/041,938

(22) Filed: Jul. 23, 2018

(65) Prior Publication Data

US 2019/0072674 A1    Mar. 7, 2019

(30) Foreign Application Priority Data

Sep. 5, 2017    (JP) .............................. JP2017-170321

(51) Int. Cl.
*G01S 19/45* (2010.01)
*B60W 30/08* (2012.01)
(Continued)

(52) U.S. Cl.
CPC .............. *G01S 19/45* (2013.01); *B60W 30/08* (2013.01); *G01S 7/41* (2013.01); *G01S 13/867* (2013.01);
(Continued)

(58) Field of Classification Search
CPC ....... G01S 19/45; G01S 7/412; G05D 1/0088; G05D 1/0274; G05D 1/0246;
(Continued)

(56) References Cited

U.S. PATENT DOCUMENTS 5,902,351 A  *  5/1999  Streit ..................... G01C 21/28
                                                                  701/446
9,140,792 B2 *  9/2015  Zeng ....................... G01S 17/04
(Continued)

FOREIGN PATENT DOCUMENTS

JP        2007-322138 A     12/2007
JP        2009-205226 A      9/2009
(Continued)

*Primary Examiner* — Cassi J Galt

(74) *Attorney, Agent, or Firm* — Sughrue Mion, PLLC

(57) ABSTRACT

A host vehicle position estimation device includes a object database configured to store information on detected objects in which a position of each of the objects on the map and an object-detectable area are associated with each other, a measurement position acquisition unit configured to acquire a measurement position which is the position of the host vehicle on the map, measured by a vehicle-mounted measurement unit, a candidate object recognition unit configured to recognize a candidate object which is associated with the object-detectable area including the measurement position among the objects, based on the object-detectable area in the information on the detected objects and the measurement position, and a host vehicle position estimation unit configured to estimate a host vehicle position based on a position of the candidate object on the map and a result of detection performed by the vehicle-mounted sensor.

4 Claims, 9 Drawing Sheets

(51) Int. Cl.
*G01S 7/41* (2006.01)
*G01S 13/86* (2006.01)
*G05D 1/00* (2006.01)
*G08G 1/13* (2006.01)
*G05D 1/02* (2020.01)

(52) U.S. Cl.
CPC ............ *G05D 1/0088* (2013.01); *G08G 1/13* (2013.01); *G05D 1/0257* (2013.01); *G05D 1/0278* (2013.01)

(58) Field of Classification Search
CPC .... G05D 1/0257; G05D 1/0278; G01C 21/32; G01C 21/3602
See application file for complete search history.

(56) References Cited

U.S. PATENT DOCUMENTS

| | | | |
|---|---|---|---|
| 9,965,699 B2* | 5/2018 | Sorstedt | G01S 19/48 |
| 10,474,162 B2* | 11/2019 | Browning | G05D 1/024 |
| 2011/0010033 A1 | 1/2011 | Asahara et al. | |
| 2018/0059680 A1* | 3/2018 | Tateishi | G08G 1/163 |
| 2020/0005058 A1* | 1/2020 | Mielenz | G01S 11/12 |

FOREIGN PATENT DOCUMENTS

| | | |
|---|---|---|
| JP | 2011-123551 A | 6/2011 |
| JP | 2012-215442 A | 11/2012 |
| JP | 2013-073250 A | 4/2013 |
| JP | 2017-021427 A | 1/2017 |

\* cited by examiner

HOST VEHICLE POSITION ESTIMATION DEVICE

CROSS-REFERENCE TO RELATED APPLICATION

This application claims the benefit of priority from Japanese Patent Application No. 2017-170321, filed Sep. 5, 2017, the entire contents of which are incorporated herein by reference.

TECHNICAL FIELD

The present disclosure relates to a host vehicle position estimation device.

BACKGROUND

In the related art, Japanese Unexamined Patent Publication No. 2007-322138 is known as a technical literature relating to a host vehicle position estimation device. In the literature, a device for estimating a position of a mobile device on a map based on a position of a landmark (an object) detected by a LASER range finder (a sensor) provided in the mobile device such as an autonomous mobile robot and a position of a landmark included in map information.

SUMMARY

In the device in the related art, for example, when a plurality of objects are close to each other on the map, the object detected by the sensor may be erroneously recognized as an adjacent object which cannot be detected by the sensor. As a result, there is a problem in that the position on the map is erroneously estimated, and thus, there is a room for improving accuracy in the estimation.

Therefore, in the present technical field, it is desirable to provide a host vehicle position estimation device that can improve the accuracy in estimating the host vehicle position on the map.

According to an aspect of the present disclosure, there is provided a host vehicle position estimation device configured to detect objects of each of which a position on a map is set in advance using a vehicle-mounted sensor, and configured to use the objects for estimating a host vehicle position which is a position of the host vehicle on the map, the device including: a object database configured to store information on the detected objects in which the position of each of the objects on the map and an object-detectable area are associated with each other; a measurement position acquisition unit configured to acquire a measurement position which is the position of the host vehicle on the map, measured by a vehicle-mounted measurement unit; a candidate object recognition unit configured to recognize a candidate object which is associated with the object-detectable area including the measurement position among the objects, based on the object-detectable area in the information on the detected objects and the measurement position; and a host vehicle position estimation unit configured to estimate the host vehicle position based on a position of the candidate object on the map and a result of detection performed by the vehicle-mounted sensor.

In the host vehicle position estimation device according to the aspect of the present disclosure, the object-detectable area is stored in the object database in association with the position of the object on the map. The object associated with the object-detectable area including the measurement position is recognized by the candidate object recognition unit, as a candidate object. The host vehicle position estimation unit estimates the host vehicle position based on the candidate object and the object detected by the vehicle-mounted sensor of the host vehicle. In this way, the estimation of the host vehicle position erroneously using an object which cannot be detected by the vehicle-mounted sensor of the host vehicle from the measurement position, can be suppressed. As a result, it is possible to improve the accuracy in estimating the host vehicle position on the map.

According to another aspect of the present disclosure, there is provided a host vehicle position estimation device configured to detect objects of each of which a position on a map is set in advance using a vehicle-mounted sensor, and configured to use the objects for estimating a host vehicle position which is a position of the host vehicle on the map, the device including: a object database configured to store information on the position of each of the objects on the map; a measurement position acquisition unit configured to acquire a measurement position which is the position of the host vehicle on the map measured by a vehicle-mounted measurement unit; a candidate object recognition unit configured to recognize a candidate object included in a detection range of the vehicle-mounted sensor of the host vehicle among the objects, based on the measurement position, the detection range of the vehicle-mounted sensor, and the information on the position of each of the objects on the map; and a host vehicle position estimation unit configured to estimate the host vehicle position based on a position of the candidate object on the map and a result of detection performed by the vehicle-mounted sensor.

In the host vehicle position estimation device according to the aspect of the present disclosure, the object included in the detection range of the vehicle-mounted sensor of the host vehicle among the objects is recognized as the candidate object. The host vehicle position is estimated based on the candidate object and the object detected by the vehicle-mounted sensor of the host vehicle. In this way, the estimation of the host vehicle position erroneously using an object that is not included in the detection range of the vehicle-mounted sensor of the host vehicle can be suppressed. As a result, it is possible to improve the accuracy in estimating the host vehicle position on the map.

The host vehicle position estimation device according the aspect of the present disclosure may further include: a shield database configured to store shield information including the information on a position of a shield on the map. The candidate object recognition unit may be configured to recognize the candidate object based on the measurement position, the detection range of the vehicle-mounted sensor, the information on the position of each of the objects on the map, and the shield information. According to the host vehicle position estimation device, the object included in the detection range of the vehicle-mounted sensor of the host vehicle among the objects is recognized as a candidate object while considering the shield information including the information on the position of the shield. In this way, the estimation of the host vehicle position erroneously using the object that cannot be detected by the vehicle-mounted sensor of the host vehicle due to the shield, can be suppressed. As a result, it is possible to improve the accuracy in estimating the host vehicle position on the map.

As described above, according to one or another aspect of the present disclosure, it is possible to improve the accuracy in estimating the host vehicle position on the map.

DETAILED DESCRIPTION

Hereinafter, embodiments of the present disclosure will be described with reference to the drawings.

First Embodiment

Figure 1:
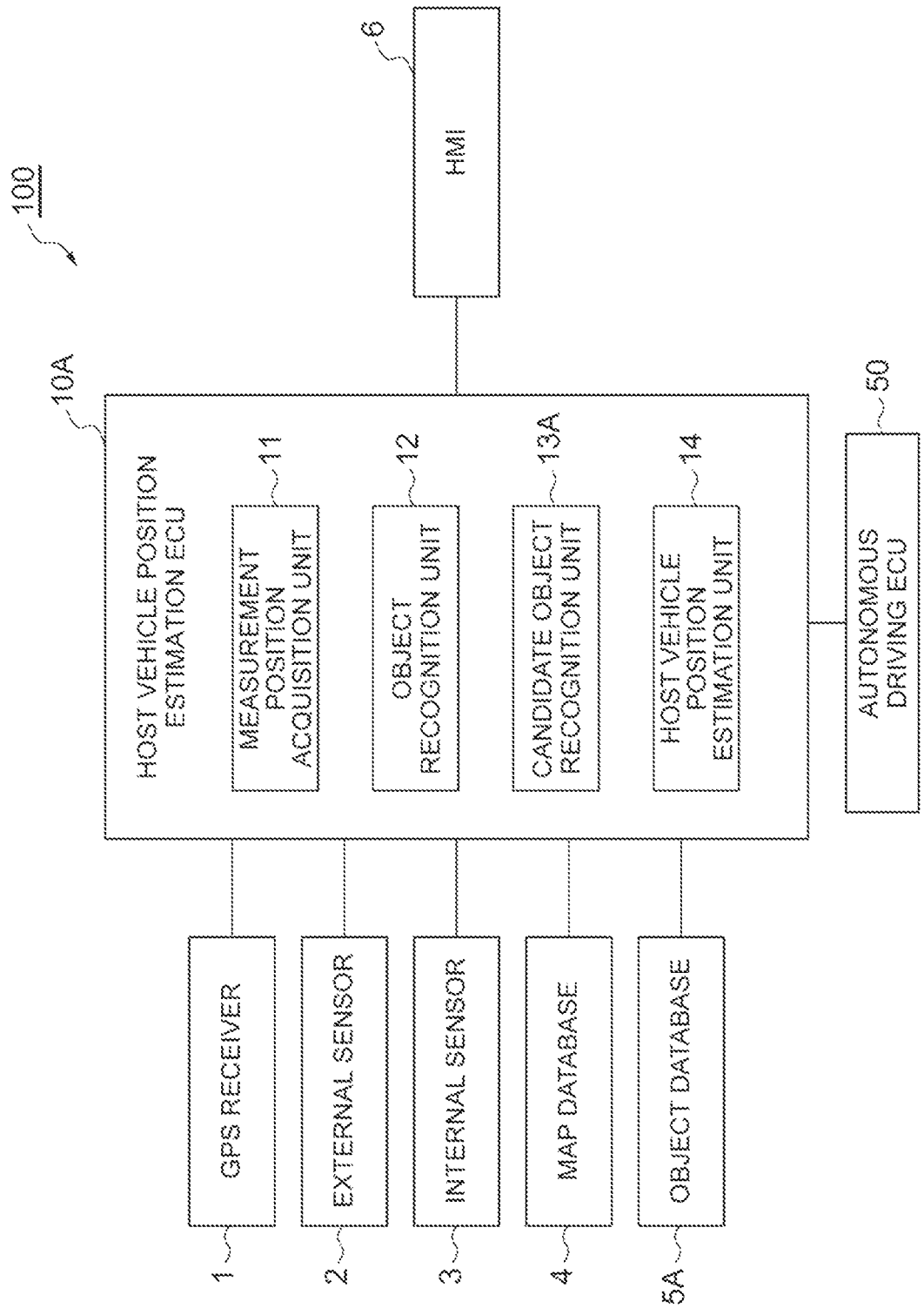
FIG. 1 is a block diagram illustrating a host vehicle position estimation device in a first embodiment.

FIG. 1 is a block diagram illustrating a host vehicle position estimation device 100 in a first embodiment. As illustrated in FIG. 1, the host vehicle position estimation device 100 performs estimation of a host vehicle position (host vehicle position estimation, localization), which is a position of the host vehicle such as a passenger car on the map. The host vehicle position estimation is to estimate the host vehicle position on the map using information on the position of an object on the map. The host vehicle position estimation device 100 detects an object, using an external sensor 2 (vehicle-mounted sensor), the position of the object on the map being set in advance, and uses the object for the estimation of the host vehicle position.

Configuration of Host Vehicle Position Estimation Device 100

As illustrated in FIG. 1, the host vehicle position estimation device 100 includes a host vehicle position estimation electronic control unit (ECU) 10A that performs overall management of the system. The host vehicle position estimation ECU 10A is an electronic control unit including a central processing unit (CPU), read only memory (ROM), random access memory (RAM), a controller area network (CAN) including a communication network, and the like. In the host vehicle position estimation ECU 10A, for example, various functions are realized by loading a program stored in the ROM into the RAM and executing the program loaded in the RAM by the CPU. The host vehicle position estimation ECU 10A may be configured with a plurality of electronic units.

The host vehicle position estimation ECU 10A is connected to a GPS receiver (measurement unit) 1, an external sensor (vehicle-mounted sensor) 2, an internal sensor 3, a map database 4, a object database 5A, a human machine interface (HMI) 6, and an autonomous driving ECU 50.

The GPS receiver 1 is a measurement unit that measures a position of the host vehicle on the map (for example, latitude and longitude of the vehicle) by receiving signals from equal to or more than three GPS satellites. The GPS receiver 1 transmits the measured information on the position of the host vehicle to the host vehicle position estimation ECU 10A.

The external sensor 2 is a vehicle-mounted detection device that detects a surrounding environment of the host vehicle. The external sensor 2 includes at least one of a camera and a radar sensor.

The camera is an imaging device that images the external situation of the host vehicle. The camera is provided on the inside of windshield of the host vehicle. The camera transmits image information relating to the external situation of the host vehicle to the host vehicle position estimation ECU 10A. The camera may be a monocular camera or may be a stereo camera. The stereo camera has two imaging units that are arranged so as to reproduce a binocular parallax. The image information of the stereo camera also includes information on the depth direction.

The radar sensor is a detection device that detects obstacles around the host vehicle using radio waves (for example, millimeter waves) or light. The radar sensor includes, for example, millimeter wave radar or a light detection and ranging (LIDAR). The radar sensor transmits the radio wave or light to the surroundings of the host vehicle, and detects the obstacles by receiving radio waves or light reflected from obstacles. The radar sensor transmits the detected obstacle information to the host vehicle position estimation ECU 10A. Obstacles include fixed objects such as guardrails and buildings, and movable objects such as pedestrians, bicycles, other vehicles, and the like.

The external sensor 2 has a predetermined sensor detection range (detection range). As an example, the camera has a sensor detection range spreading at a predetermined detection angle on both sides in the vehicle width direction with a longitudinal vehicle length direction of the host vehicle as a reference. The camera can detect an article existing within the sensor detection range in front of the host vehicle. The LIDAR has a sensor detection range spreading in all directions (omnidirectional) around the host vehicle with a place where the LIDAR is mounted on the vehicle body of the host vehicle as a reference. The LIDAR can detect the article existing within the sensor detection range around the host vehicle using such a sensor detection range. The sensor detection range of the LIDAR is not limited to all directions, but may have a sensor detection range spreading at a predetermined detection angle on both sides in the vehicle width direction with the longitudinal vehicle length direction of the host vehicle as a reference.

The internal sensor 3 is a detection device that detects a traveling state of the host vehicle. The internal sensor 3 includes a vehicle speed sensor, an accelerator sensor, and a yaw rate sensor. The vehicle speed sensor is a measuring device that measures a speed of the host vehicle. As the vehicle speed sensor, for example, a vehicle wheel speed sensor is used, which is provided on vehicle wheels of the host vehicle or on a drive shaft rotating integrally with vehicle wheels, and measures a rotational speed of the vehicle wheels. The vehicle speed sensor transmits the measured vehicle speed information (vehicle wheel speed information) to the host vehicle position estimation ECU 10A.

The accelerator sensor is a measuring device that measures an acceleration of the host vehicle. The accelerator sensor includes, for example, a longitudinal accelerator sensor that measures acceleration in the longitudinal direction of the host vehicle and a lateral accelerator sensor that measures a lateral acceleration of the host vehicle. The accelerator sensor transmits, for example, acceleration information of the host vehicle to the host vehicle position estimation ECU 10A. The yaw rate sensor is a measuring device that measures a yaw rate (rotation angular velocity) around the vertical axis at the center of gravity of the host vehicle. As the yaw rate sensor, for example, a Gyro sensor can be used. The yaw rate sensor transmits the measured yaw rate information of the host vehicle to the host vehicle position estimation ECU 10A. The result of measurement performed by the internal sensor 3 (vehicle speed information, yaw rate information, and the like) may be used for measuring the position of the host vehicle on the map. In this case, the internal sensor 3 functions as a measurement unit for measuring the position of the host vehicle on the map.

The map database 4 is a database storing map information. The map database 4 is formed, for example, in a hard disk drive (HDD) mounted on the vehicle. The map information includes information on the position of a road, information on a shape of the road (for example, a curve, types of straight lines, a curvature of the curve or the like), information on the position on an intersection and a branch, and information on the position on a structure such as a building. The map database 4 may be formed in a server that can communicate with the host vehicle.

The object database 5A is a database that stores information on the detected object in which the position of the object on the map and an object-detectable area of the object are associated. The object is an article of which a position on the map (for example, longitude, latitude, or the like in the world coordinate system) is set in advance. The object is used as a reference for the host vehicle position estimation. The object includes at least one of a structure provided on a road or around the road and a road sign appeared on a road surface. The object may include a part of the structure or a part of the road sign.

The structure includes at least one of a pole, a road sign, a guardrail, a delineator, a wall, a traffic signal, an exit and entrance of a tunnel, an ETC gate, and a building. The road sign includes at least one of a regulatory sign and an instruction sign. The regulatory sign includes a turn prohibition mark, a maximum speed mark, and the like. The instruction sign includes a lane line (a roadway center line, a roadway outside line, a lane boundary line, and the like), a rhombic mark indicating that there is a pedestrian crossing ahead, a triangle mark indicating that there is a priority road ahead, a traveling direction mark, a crosswalk sign, a temporary stop line, and the like.

If the lane line is appeared as continuous dotted lines (dashed lines), each dotted line (dashed line) may be treated as an object. In addition, end portions (front end and rear end) in the road extending direction of each dotted line may be treated as the objects respectively. In addition, well-known objects in the technical field of in estimating the host vehicle position can be adopted as the objects.

Figure 2:
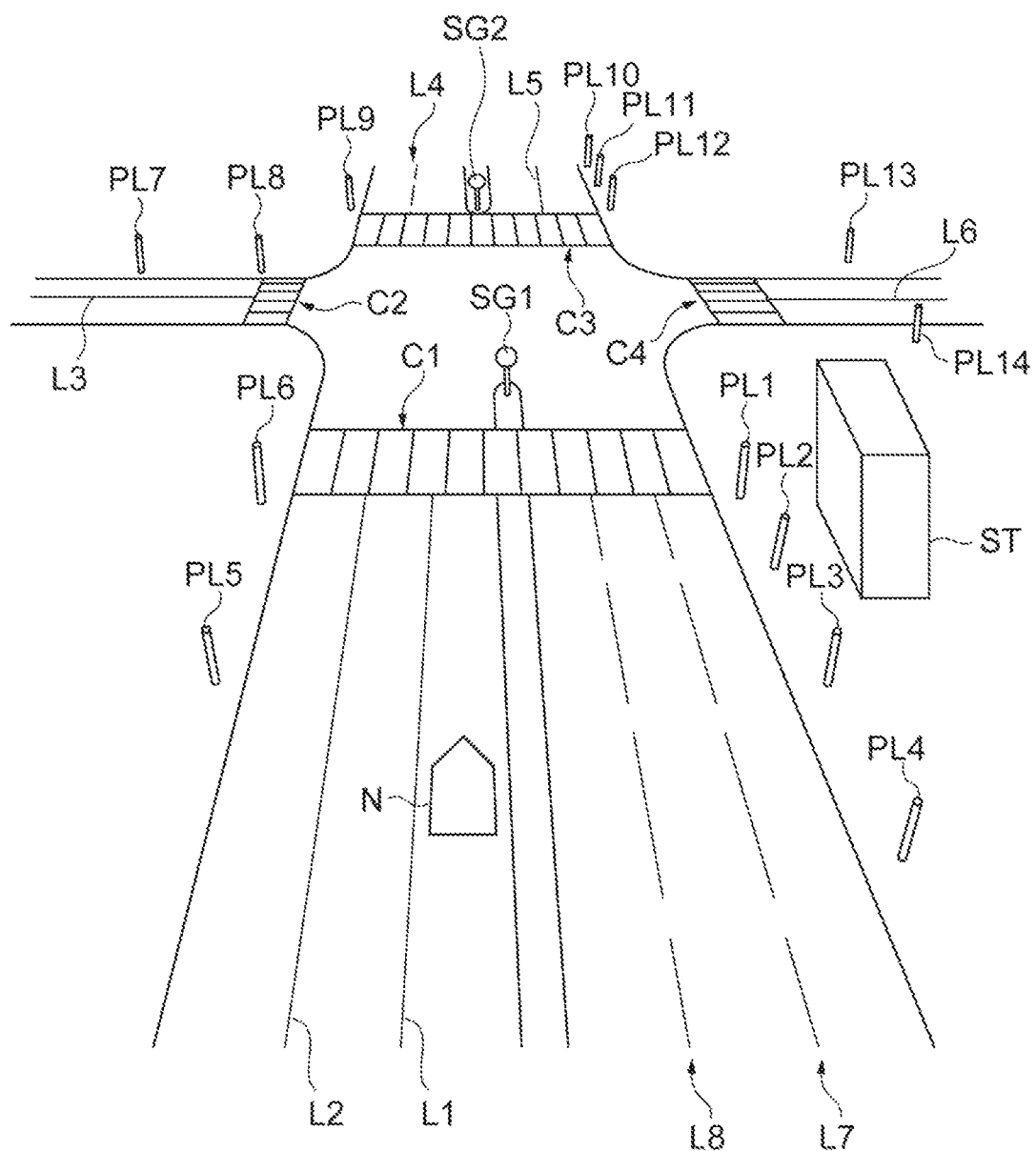
FIG. 2 is a diagram for explaining information on a detected object.

FIG. 2 is a diagram for explaining information on the detected object. In FIG. 2, a situation in which poles PL 1 to PL14, road surface marking lines L1 to L8, crosswalks C1 to C4, signs SG1 and SG2, and a structure ST are provided around a crossroad intersection, is illustrated as an example of the object.

The object-detectable area is an area set in advance as an area from which the host vehicle can detect an object. The object-detectable area is set based on a result of detection of an object using a vehicle (probe car) having the same type as the host vehicle, for example.

For example, in FIG. 2, a vehicle N for acquiring a collection of the above coordinates is illustrated. The vehicle N is a vehicle different from the host vehicle and is provided with an external sensor having a sensor detection range the same as that of the external sensor 2. In this example, a sensor detection range E is illustrated as a substantially circular range with a fixed distance with the vehicle N as a center. Position information (coordinates on the map) on the object and information on the position (coordinates on the map) on the vehicle N are acquired for each position of the vehicle N by causing the vehicle N to travel on each road on the map in advance, and the results are integrated for each position on which the vehicle N traveled.

The acquired object are objects that can be detected by the external sensor of the vehicle N at each position of the vehicle N. That is, the sensor detection range E of the external sensor of vehicle N is substantially reflected in the information on the position of the acquired object. Accordingly, by storing the information on the detected object in which the information on the position of acquired object and the information on the position of the vehicle N are associated with each other in the object database 5A, it is possible to substantially extract the object that can be detected from the position of the host vehicle by the external sensor 2 of the host vehicle using the information on the detected object.

In the information on the detected object, the traveling direction information of the host vehicle may be associated with the information on the position of the object in addition to the information on the position of the host vehicle. For example, if the host vehicle is provided with an external sensor of which the sensor detection range is narrower than the sensor detection range of the external sensor spreading in all directions, the traveling direction information of the host vehicle can be used for correcting the sensor detection range for detecting the object based on the traveling direction information.

The object database 5A may be formed in a server that can communicate with the host vehicle. The object database 5A may be a database integrated with the map database 4. In addition, example of the shields that interfere with the detection activity of the external sensor 2 may include stationary obstacles such as trees, median dividers, guardrails, telephone poles, walls, buildings, and the like.

The HMI 6 is an interface that performs inputting and outputting of the information between the host vehicle position estimation device 100 and the occupant (including the driver). The HMI 6 includes, for example, a display, a speaker, and the like. The HMI 6 outputs an image on the display and outputs a voice from the speaker according to a control signal from the host vehicle position estimation ECU 10A. The display may be a head-up display. The HMI 6 includes input devices (buttons, a touch panel, a voice input device, or the like) for accepting input from the occupant. It is not necessary for the host vehicle position estimation ECU 10A to be connected to the HMI 6.

The autonomous driving ECU 50 is mounted on the host vehicle and is an electronic control unit for performing the autonomous driving of the host vehicle. The autonomous driving means a vehicle control in which the host vehicle autonomously travels without a driving operation by a driver. The autonomous driving ECU 50 may be configured with a plurality of electronic units. A part of the functions of the autonomous driving ECU 50 may be performed by a server that can communicate with the host vehicle.

The autonomous driving ECU 50 generates a travel plan along the target route set in advance based on the information on the position of the host vehicle measured by the GPS receiver 1, the map information in the map database 4, the surrounding environment (the position of another vehicle, or the like) of the host vehicle recognized from the result of detection performed by the external sensor 2, and the vehicle state (vehicle speed, yaw rate, and the like) recognized from the result of detection performed by the internal sensor 3. The target route is set by the occupant of the host vehicle or a well-known navigation system. The navigation system may be integrated in the autonomous driving ECU 50.

The autonomous driving ECU 50 performs the autonomous driving according to the travel plan. The travel plan includes, for example, a moving path and a moving speed. The autonomous driving ECU 50 performs the autonomous driving by transmitting a control signal to actuators of the host vehicle (an engine actuator, a steering actuator, a brake actuator, or the like). The autonomous driving ECU 50 can generate a travel plan and perform the autonomous driving using a well-known method. It is not necessary for the host vehicle position estimation ECU 10A to be connected to the autonomous driving ECU 50.

Next, a functional configuration of the host vehicle position estimation ECU 10A will be described. The host vehicle position estimation ECU 10A includes a measurement position acquisition unit 11, an object recognition unit 12, a candidate object recognition unit 13A, and a host vehicle position estimation unit 14. A part of the functions of the host vehicle position estimation ECU 10A described below may be performed in the server that can communicate with the host vehicle.

The measurement position acquisition unit 11 acquires a measurement position which is the position of the host vehicle on the map based on the information on the position of the host vehicle measured by the GPS receiver 1. The measurement position acquisition unit 11 may acquire the measurement position of the host vehicle from a history of the vehicle speed (or the history of the vehicle wheel rotation speed) of the host vehicle and the history of the yaw rate of the host vehicle based on the result of detection performed by the internal sensor 3. In other words, the measurement position acquisition unit 11 may acquire the measurement position of the host vehicle by a so-called odometry using a well-known method.

The measurement position of the host vehicle is a position on the map used as a premise in estimating the host vehicle position using the object. The measurement position of the host vehicle is measured by the measurement unit in the host vehicle (the GPS receiver 1, the internal sensor 3, or the like).

The object recognition unit 12 recognizes the position of the object on the map used for the host vehicle position estimation based on the information on the position of the object detected by the external sensor 2. The object recognition unit 12 recognizes the position of the object on the map, which can be actually detected by the external sensor 2. Therefore, for example, if there exists a shield between the host vehicle and the object, the object recognition unit 12 does not recognize the position of the object on the map, which cannot be actually detected by the external sensor 2. Examples of the shield include a structure such as a building and a moving body such as another vehicle.

The candidate object recognition unit 13A recognizes a candidate object associated with the object-detectable area including the measurement position among the objects stored in the object database 5A based on the object-detectable area in the information on the detected object and the measured measurement position of the host vehicle. The candidate object is an object considered to be detectable by the external sensor 2 from the measurement position of the host vehicle among the objects in the information on the detected object stored in the object database 5A.

Figure 3:
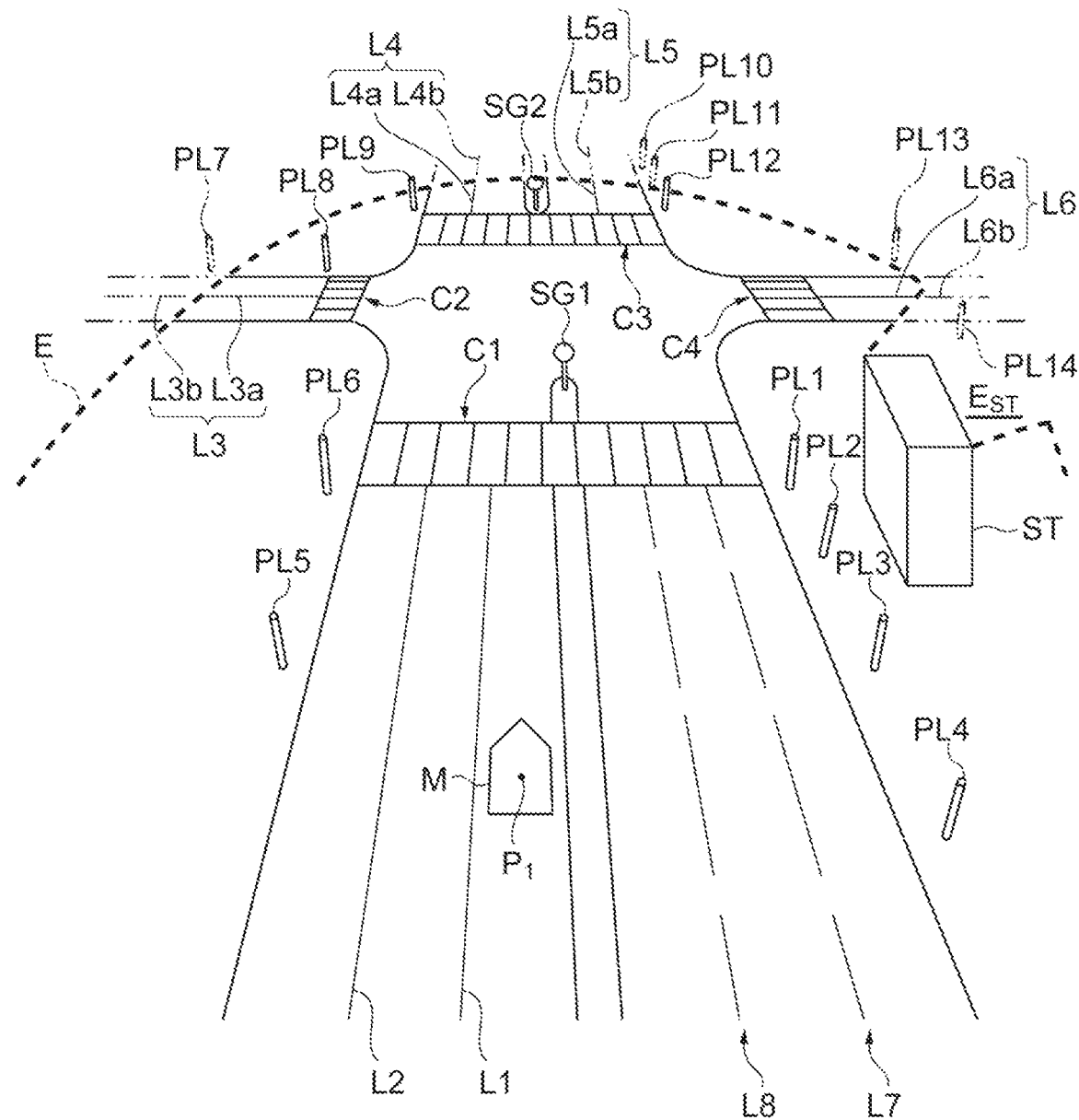
FIG. 3 is a diagram for explaining a candidate object in the first embodiment.

FIG. 3 is a diagram for explaining the candidate object in the first embodiment. In the example illustrated in FIG. 3, a candidate object when the host vehicle M reaches a position $P_1$ is indicated by a solid line. Specifically, the candidate object is an object that is included in the sensor detection range E of the external sensor 2 and is not included in a range $E_{ST}$ shielded by a shield such as a structure among the objects in the information on the detected objects. In the example illustrated in FIG. 3, the candidate objects are the poles PL1 to PL6, PL8, PL9, and PL12, the road surface marking lines L1, L2, L3a, L4a, L5a, L6a, L7, and L8, the crosswalks C1 to C4, and the signs SG1 and SG2. The candidate object recognition unit 13A recognizes the objects (the poles PL1 to PL6, PL8, PL9, and PL12, the road surface marking lines L1, L2, L3a, L4a, L5a, L6a, L7, and L8, the crosswalks C1 to C4, and the signs SG1 and SG2) that are detectable by the external sensor 2 from the position $P_1$ which is the measurement position of host vehicle M, as the candidate objects.

In addition, in the example illustrated in FIG. 3, objects other than the candidate objects when the host vehicle M reaches the position $P_1$ is indicated by a two-dot chain line. The objects other than the candidate objects are the objects which are not included in the sensor detection range E of the external sensor 2 or the objects which are included in the sensor detection range E of the external sensor 2 but included in the range $E_{ST}$ that is shielded by the structure ST, among the objects in the information on the detected objects. In the example illustrated in FIG. 3, the objects other than the candidate object are poles PL7, PL10, PL11, PL13, and PL14, and the road surface marking lines L3b, L4b, L5b, and L6b.

The candidate object recognition unit 13A may recognize the candidate object using the position measured by the GPS receiver 1 as it is as the measurement position of the host vehicle. The candidate object recognition unit 13A may correct the position measured by the GPS receiver 1 so as to get close to the position of the vehicle which is associated with the position of the object, and may recognize the candidate object using the correction resulting position as the measurement position of the host vehicle. For example, a prediction by the Kalman filter or the particle filter based on the estimated host vehicle position may be used for the error correction.

The host vehicle position estimation unit 14 estimates the host vehicle position based on the position of the candidate object on the map recognized by the candidate object recognition unit 13A and the result of detection of the external sensor 2. The host vehicle position estimation unit 14 estimates the host vehicle position by collating the recognized position of the candidate object on the map and the position of the object on the map detected by the external sensor 2. A well-known method can be adopted as a method of collating.

If an error (deviation) of the positions between the position of the candidate object on the map and the position of the object on the map is large based on the result of collation performed by the host vehicle position estimation unit 14, the autonomous driving ECU 50 may change the processing of the autonomous driving ECU 50. For example, if the error of the positions between the position of the candidate object on the map and the position of the object on the map is larger than the predetermined threshold value, the autonomous driving ECU 50 may change the travel plan such that the moving speed is decreased. In addition, if the error of the positions between the position of the candidate object on the map and the position of the object on the map is large, the autonomous driving ECU 50 may stop the autonomous driving.

In addition, if the error of the positions between the position of the candidate object on the map and the position of the object on the map is large, the autonomous driving ECU 50 may control the HMI 6 so as to notify such a fact. For example, if the error of the positions between the position of the candidate object on the map and the position of the object on the map is large, the autonomous driving ECU 50 may display characters or images indicating such a fact. In addition, if the error of the positions between the position of the candidate object on the map and the position of the object on the map is large, the autonomous driving ECU 50 may output a voice indicating such a fact to the speaker.

Calculation Processing by Host Vehicle Position Estimation Device 100

Figure 4:
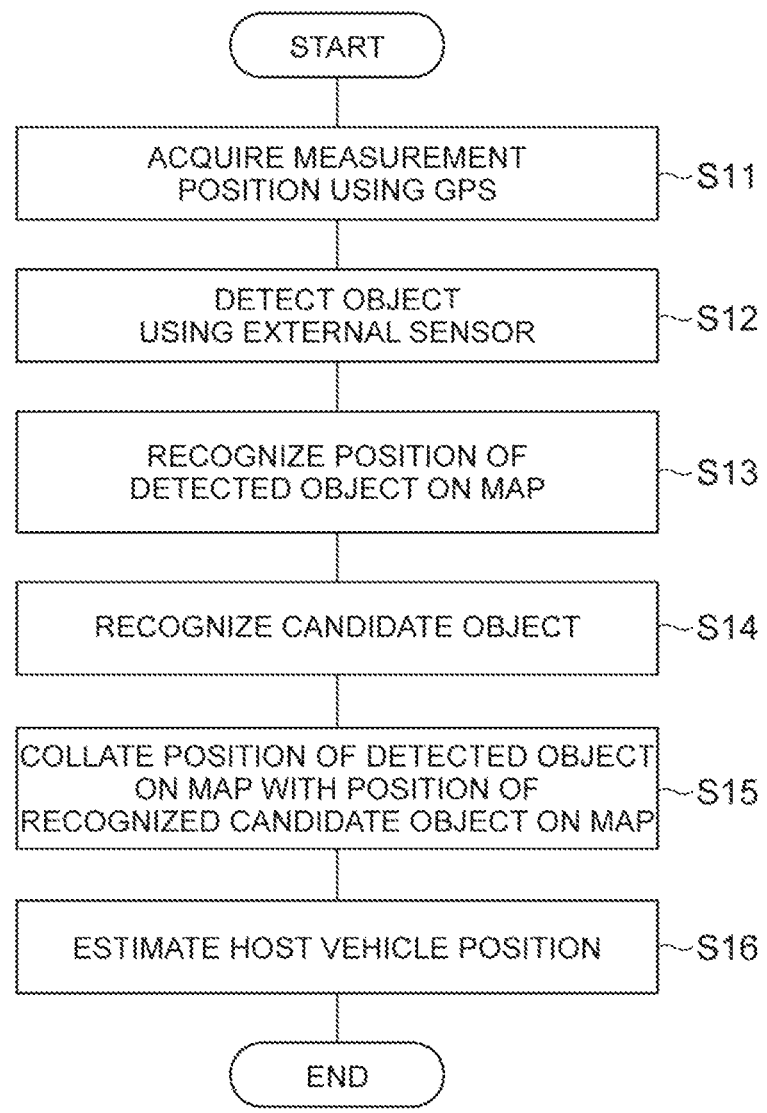
FIG. 4 is a flowchart illustrating an example of processing by a host vehicle position estimation ECU in FIG. 1.

Next, an example of calculation processing by the host vehicle position estimation device 100 will be described. FIG. 4 is a flowchart illustrating an example of calculation processing by the host vehicle position estimation device 100. The processing in the flowchart illustrated in FIG. 4 is executed, for example, while the host vehicle M is traveling.

As illustrated in FIG. 4, in S11, the host vehicle position estimation ECU 10A of the host vehicle position estimation device 100 acquires the measurement position of the host vehicle M using the measurement position acquisition unit 11. The measurement position acquisition unit 11 acquires the measurement position which is a position of the host vehicle on the map based on the information on the position of the host vehicle measured by the GPS receiver 1.

In S12, the host vehicle position estimation ECU 10A detects an object using the external sensor 2. In S13, the host vehicle position estimation ECU 10A recognizes the position of the detected object on the map using the object recognition unit 12. The object recognition unit 12 recognizes the position of the object on the map used for estimating the host vehicle position based on the information on the position of the object detected by the external sensor 2.

In S14, the host vehicle position estimation ECU 10A recognizes the candidate object using the candidate object recognition unit 13A. The candidate object recognition unit 13A recognizes the candidate object associated with the object-detectable area that includes the measurement position among the objects stored in the object database 5A.

In S15, the host vehicle position estimation ECU 10A collates the position of the object on the map detected by the external sensor 2 with the position of the recognized candidate object on the map using the host vehicle position estimation unit 14. In S16, the host vehicle position estimation ECU 10A performs the estimation of the host vehicle position using the host vehicle position estimation unit 14 based on the result of collation performed in S15.

Operational Effects of the Host Vehicle Position Estimation Device 100

In the host vehicle position estimation device 100 in the first embodiment described above, the object-detectable area is stored in the object database 5A in association with the position of the object on the map. The object associated with the detectable area that includes the measurement position is recognized by the candidate object recognition unit 13A, as a candidate object. The host vehicle position estimation unit 14 estimates the host vehicle position based on the candidate object and the object detected by the vehicle-mounted sensor of the host vehicle. In this way, the estimation of the host vehicle position erroneously using an object which cannot be detected by the external sensor 2 of the host vehicle from the measurement position, can be suppressed. As a result, it is possible to improve the accuracy in estimating the host vehicle position on the map.

Second Embodiment

Figure 5:
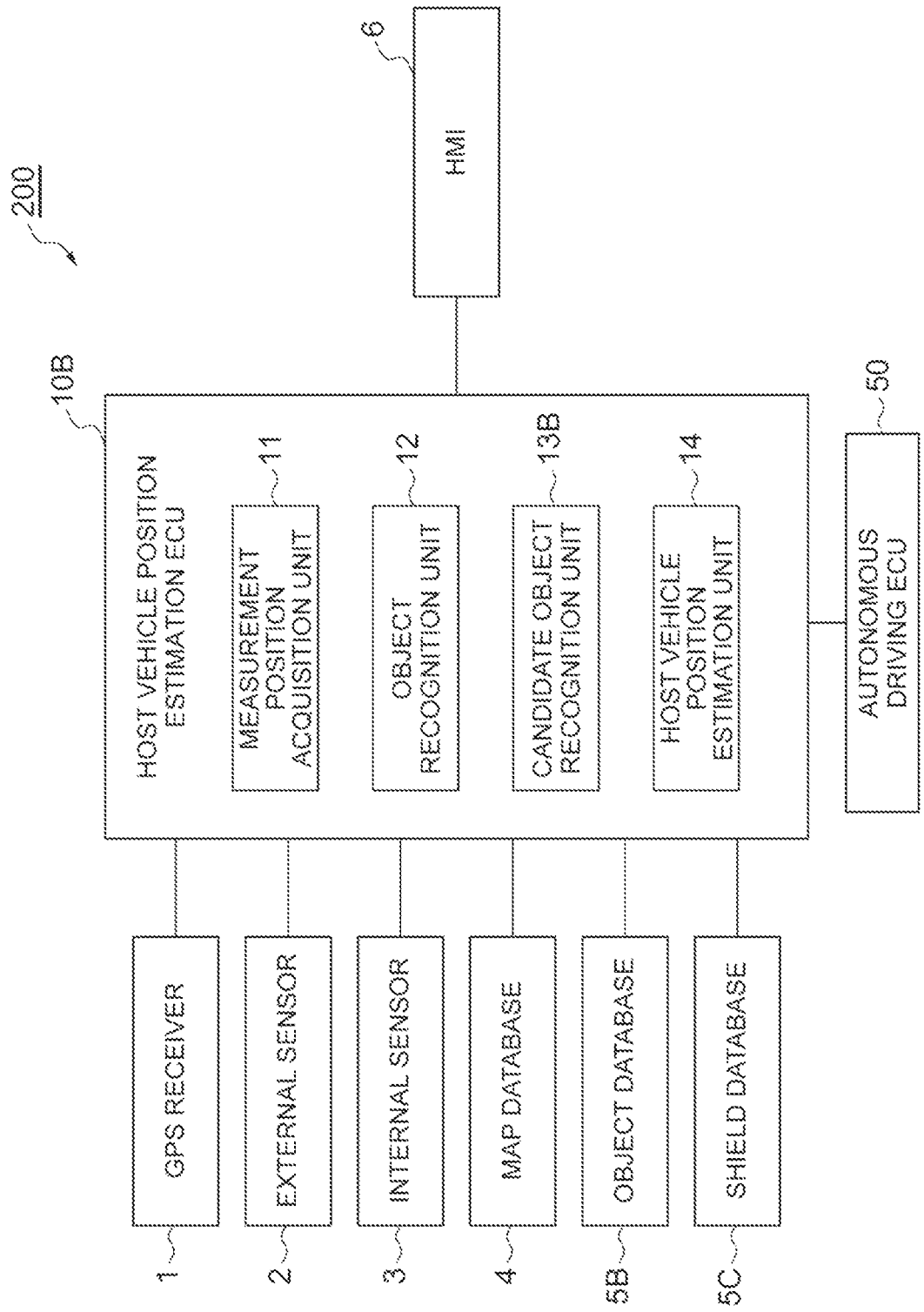
FIG. 5 is a block diagram illustrating a host vehicle position estimation device in a second embodiment.

Hereinafter, the host vehicle position estimation device in a second embodiment will be described with reference to the drawings. FIG. 5 is a block diagram illustrating a host vehicle position estimation device in the second embodiment. A host vehicle position estimation device 200 illustrated in FIG. 5 is different from the host vehicle position estimation device 100 in points that the host vehicle position estimation device 200 includes a object database 5B instead of the object database 5A, includes a host vehicle position estimation ECU 10B instead of the host vehicle position estimation ECU 10A, and further includes a shield database 5C.

Configuration of Host Vehicle Position Estimation Device 200

A object database 5B is a database that stores information on the position of an object on the map. The object database 5B is different from the object database 5A in a point that the position of the object on the map is not associated with the object-detectable area. The object database 5B may be formed in a server that can communicate with the host vehicle. The object database 5B may be a database integrated with the map database 4.

The shield database 5C is a database that stores shield information. The shield information is information on shield that interferes with the detection activity of the external sensor 2. The shield information includes information items on the position of the shield on the map and the shield dimension information. The shield includes stationary obstacles such as trees, median dividers, guardrails, telephone poles, walls, and buildings. The shield database 5C may be formed in a server that can communicate with the host vehicle. The shield database 5C may be a database integrated with the map database 4.

The host vehicle position estimation ECU 10B of the host vehicle position estimation device 200 includes a candidate object recognition unit 13B instead of the candidate object recognition unit 13A of the host vehicle position estimation ECU 10A. A function of the candidate object recognition unit 13B is different from that of the candidate object recognition unit 13A of the host vehicle position estimation ECU 10A.

The candidate object recognition unit 13B recognizes the candidate object included in the sensor detection range E of the external sensor 2 of the host vehicle among the objects based on the measurement position of the host vehicle, the sensor detection range E of the external sensor 2, the information on the position of the object on the map, and the shield information. The sensor detection range E of the external sensor 2 is a predetermined range set in advance according to the performance of the external sensor 2 (for example, in a case of an omnidirectional LIDAR, the radius is 30 m, or the like). The sensor detection range E of the external sensor 2 is stored in advance in the ROM or the like of the host vehicle position estimation ECU 10B.

The sensor detection range E of the external sensor 2 is a range in which the camera can image an article, for example, if the external sensor 2 is a camera. The sensor detection range E of the external sensor 2 is a range in which the radar sensor can detect an article, for example if the external sensor 2 is a radar sensor. In addition, if the external sensor 2 is a camera and a radar sensor, the sensor detection range E is the sum of the range in which the camera can image the article and the range in which the radar sensor can detect the article. However, even if the external sensor 2 is a camera and a radar sensor, when the object is detected only by the camera, the sensor detection range E of the external sensor 2 may be a range in which the camera can image the article. Even if the external sensor 2 is a camera and a radar sensor, when the object is detected only by the radar sensor, the sensor detection range E of the external sensor 2 may be a range in which the radar sensor can detect the article.

Specifically, the candidate object recognition unit 13B virtually extracts the object included in the sensor detection range E of the external sensor 2 of the host vehicle from the objects based on the information on the position of the object on the map stored in the object database 5B. Here, differently from the object database 5A, in the object database 5B, the position serving as a reference position (for example, the position of the vehicle equipped with the external sensor that detected the object) of the sensor detection range E at the time when the information on the position of the object on the map is acquired is not associated with the information on the position of the object on the map. Therefore, in order to virtually extract (narrow down) the detectable object while considering the sensor detection range E, the candidate object recognition unit 13B sets a reference position which is the reference position of the sensor detection range E. As an example of the reference position, the candidate object recognition unit 13B may set the reference position as the measurement position of the host vehicle as it is.

As an example of the reference position, the candidate object recognition unit 13B may use the measurement position of the host vehicle corrected in such a manner that the error between the position of the object detected by the external sensor 2 and the position of the object virtually extracted is reduced.

Specifically, the candidate object recognition unit 13B sets an assumed position of the host vehicle around the measurement position of the host vehicle. The assumed position is a position virtually set around the measurement position of the host vehicle and is a position for correcting the measurement position of the host vehicle.

The candidate object recognition unit 13B sets a plurality of assumed positions for the current measurement position of the host vehicle. The assumed position may be set on the road along the road shape based on the map information. For example, the assumed position may be set on the vehicle width center line of the lane on which the host vehicle travels based on the measurement position of the host vehicle, the vehicle speed of the host vehicle, the acceleration and the yaw rate of the host vehicle. For example, the assumed position may be set on the vehicle width center line of the stop line in the intersection. For setting the assumed position, for example, a prediction using the Kalman filter or the particle filter based on the estimated latest value of the host vehicle position may be used. The candidate object recognition unit 13B may set a single assumed position for the current measurement position of the host vehicle.

The candidate object recognition unit 13B selects an assumed position based on the preset assumed position and the measurement position of the host vehicle. The candidate object recognition unit 13B selects one assumed position that makes an error between the assumed position and the measurement position of the host vehicle be smallest, from the set plurality of assumed positions.

The candidate object recognition unit 13B recognizes the candidate object based on the selected assumed position, the information on the position of the object, and the sensor detection range E. Specifically, the candidate object recognition unit 13B extracts the object included in the sensor detection range E of the external sensor 2 around the reference position from the objects of which the position on the map is recognized.

The candidate object recognition unit 13B removes the object included in the first shielding range from the extracted object included in the sensor detection range E of the external sensor 2 based on the extracted object and the shield information in the shield database 5C. The first shielding range is a range in which the stationary obstacles such as structures interfere with the detection activity of the external sensor 2. The first shielding range is a range shielded by the stationary obstacles such as structures as seen from the reference position in the sensor detection range E around the reference position.

The candidate object recognition unit 13B removes the objects included in the second shielding range based on the objects resulting from the removal of the objects included in the first shielding range and the result of detection performed by the external sensor 2. The second shielding range is a range shielded by the moving obstacle such as another vehicle seen from the reference position among the sensor detection range E from which the first shielding range has been removed. The candidate object recognition unit 13B recognizes the object resulting from the removal of the object included in the second shielding range, as a candidate object. The moving obstacle may include other vehicles, bicycles, pedestrians, and the like. The moving obstacle can be recognized by a well-known method based on the result of detection performed by the external sensor 2, for example.

Figure 6:
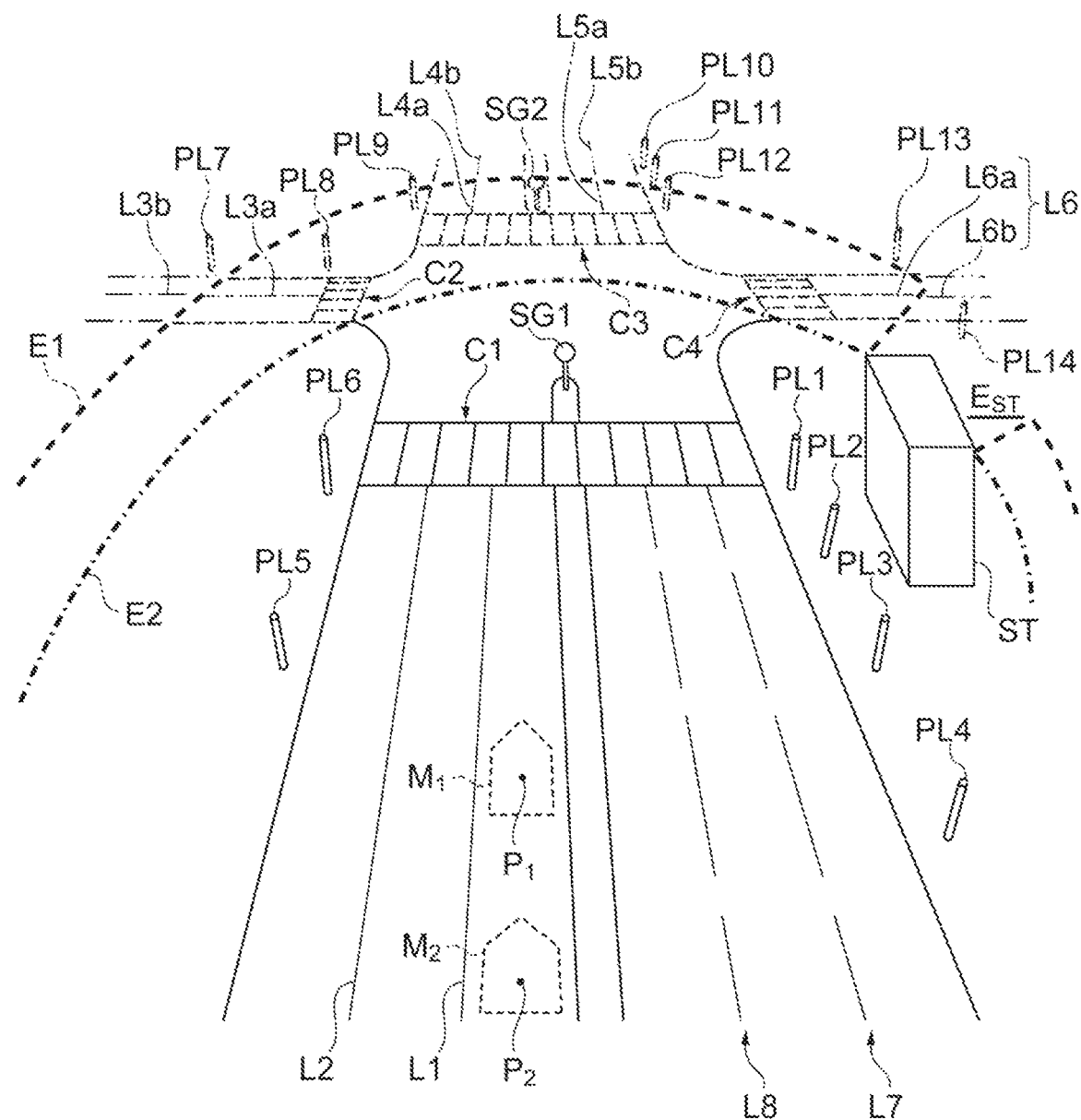
FIG. 6 is a diagram for explaining a first shielding range and an assumed position.

FIG. 6 is a diagram for explaining the first shielding range and the assumed position. In FIG. 6, assumed positions $P_1$ and $P_2$ are illustrated as the assumed positions of the host vehicle M. In FIG. 6, a host vehicle $M_1$ is the host vehicle M assumed to be positioned at the assumed position $P_1$. A host vehicle $M_2$ is the host vehicle M assumed to be positioned at the assumed position $P_2$. A detection range $E_1$ is a range excluding the first shielding range $E_{ST}$ from the sensor detection range E with the position of host vehicle $M_1$ as a center. A detection range $E_2$ is a range excluding the first shielding range $E_{ST}$ from the sensor detection range E with the position of host vehicle $M_2$ as a center. The first shielding range $E_{ST}$ is a range shielded by the structure ST seen from the assumed positions $P_1$ and $P_2$ among the sensor detection range E with the assumed positions $P_1$ and $P_2$ (reference positions) as a center respectively.

As an example, the detection ranges $E_1$ and $E_2$ are substantially circular ranges with the assumed positions $P_1$ and $P_2$ as a center respectively. The detection ranges $E_1$ and $E_2$ are not limited to the substantially circular range. The detection ranges $E_1$ and $E_2$ may be fan-shaped ranges. In addition, the detection ranges $E_1$ and $E_2$ do not need to coincide with the actual detection range of the external sensor 2, and may be ranges set virtually.

In the example illustrated in FIG. 6, for example, if the assumed position $P_1$ is selected by the candidate object recognition unit 13B, the candidate object recognition unit 13B extracts poles PL1 to PL6, PL8, PL9, PL12, and PL14, road surface marking lines L1, L2, L3a, L4a, L5a, L6a, L7, and L8, crosswalks C1 to C4, and signs SG1 and SG2 which are objects included in the detection range $E_1$ with the assumed position $P_1$ as the reference position. The candidate object recognition unit 13B removes the PL14 which is an object included in the first shielding range $E_{ST}$ with the assumed position $P_1$ as the reference position. Accordingly, the candidate object recognition unit 13B recognizes poles PL1 to PL6, PL8, PL9, and PL12, the road surface marking lines L1, L2, L3a, L4a, L5a, L6a, L7, and L8, the crosswalks C1 to C4, and the signs SG1 and SG2 as the candidate objects with an assumed position $P_1$ as the reference position.

On the other hand, if the assumed position $P_2$ is selected by the candidate object recognition unit 13B, the candidate object recognition unit 13B extracts the poles PL1 to PL 6, the road surface marking lines L1, L2, L7, and L8, the crosswalk C1 and the sign SG1 which are the objects included in the detection range $E_2$ with the assumed position $P_2$ as the reference position. The candidate object recognition unit 13B recognizes the objects included in the detection range $E_2$ as the candidate object, because there is no objects included in the first shielding range $E_{ST}$ with the assumed position $P_2$ as the reference position among the objects included in the detection range $E_2$.

Figure 7:
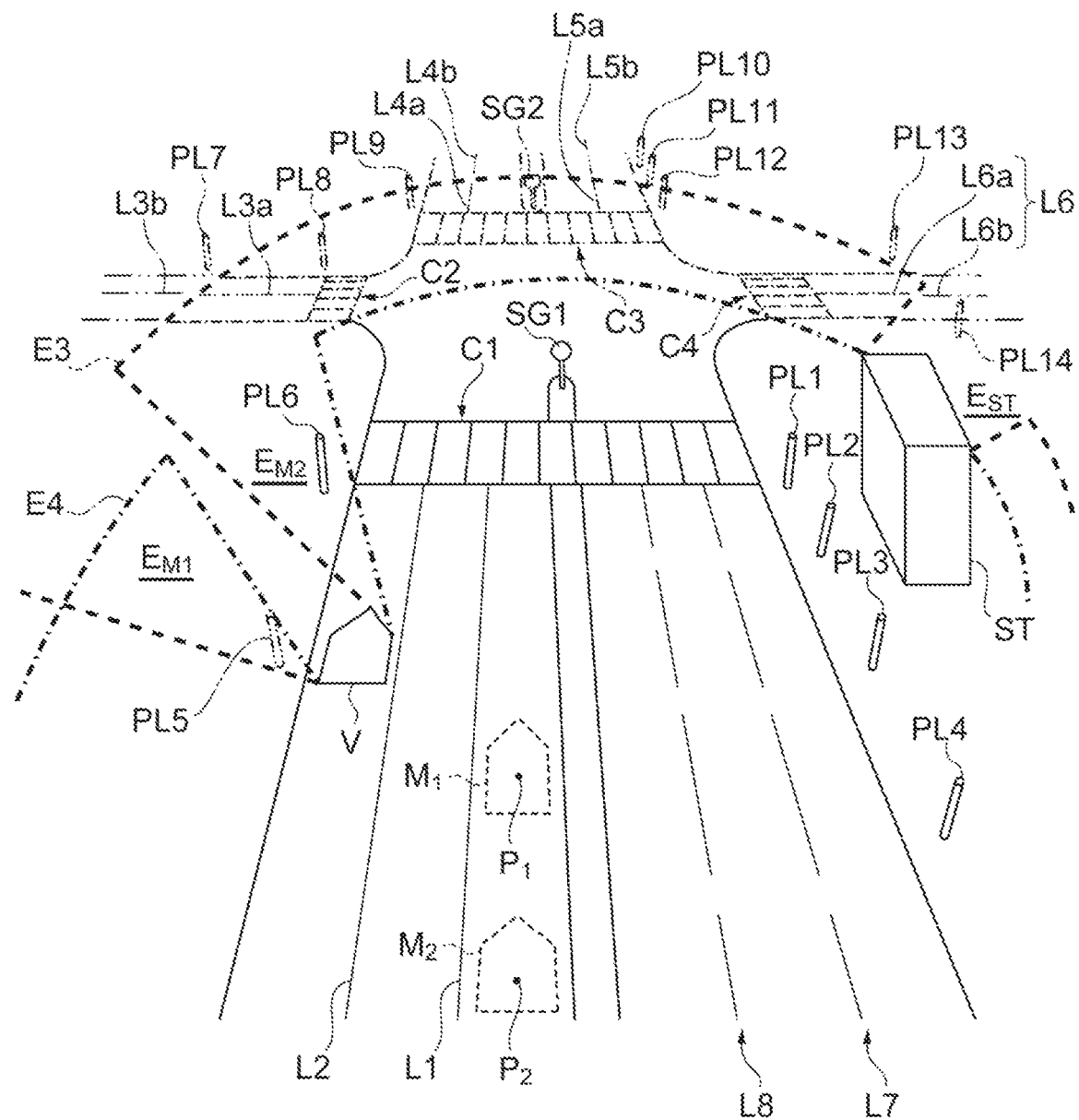
FIG. 7 is a diagram for explaining a second shielding range and the assumed position.

FIG. 7 is a diagram for explaining the second shielding range and the assumed positions. FIG. 7 illustrates a situation in which another vehicle V is traveling in the left lane of the host vehicles $M_1$ and $M_2$ in the situation in FIG. 6. A detection range $E_3$ is a range excluding second shielding range $E_{M1}$ from the detection range $E_1$. A detection range $E_4$ is a range excluding second shielding range $E_{M2}$ from the detection range $E_2$. The second shielding ranges $E_{M1}$ and $E_{M2}$ are ranges shielded by the other vehicle V seen from the assumed positions $P_1$ and $P_2$ among the sensor detection range E the assumed positions $P_1$ and $P_2$ (reference position) as a center respectively.

In the example illustrated in FIG. 7, if the assumed position $P_1$ is selected by the candidate object recognition unit 13B, the candidate object recognition unit 13B further removes the $PL_5$ which is the object included in the second shielding range $EM_1$ with the assumed position $P_1$ as the reference position, from the candidate objects with the assumed position $P_1$ as the reference position in FIG. 6. Accordingly, the candidate object recognition unit 13B recognizes the poles PL1 to PL4, PL6, PL8, PL9, and PL12, the road surface marking lines L1, L2, L3a, L4a, L5a, L6a, L7, and L8, the crosswalks C1 to C4, and the signs SG1 and SG2 as the candidate objects with the assumed position $P_1$ as the reference position.

On the other hand, if the assumed position $P_2$ is selected by the candidate object recognition unit 13B, the candidate object recognition unit 13B further removes the PL6 which is the object included in the second shielding range $E_{M2}$ with the assumed position $P_2$ as the reference position, from the candidate objects with the assumed position $P_2$ as the reference position in FIG. 6. Accordingly, the candidate object recognition unit 13B recognizes the poles PL1 to PL5, the road surface marking lines L1, L2, L7 and L8, the crosswalk C1, and the sign SG1 as the candidate objects with the assumed position $P_2$ as the reference position.

Example of Calculation Processing by Host Vehicle Position Estimation Device 200

Figure 8:
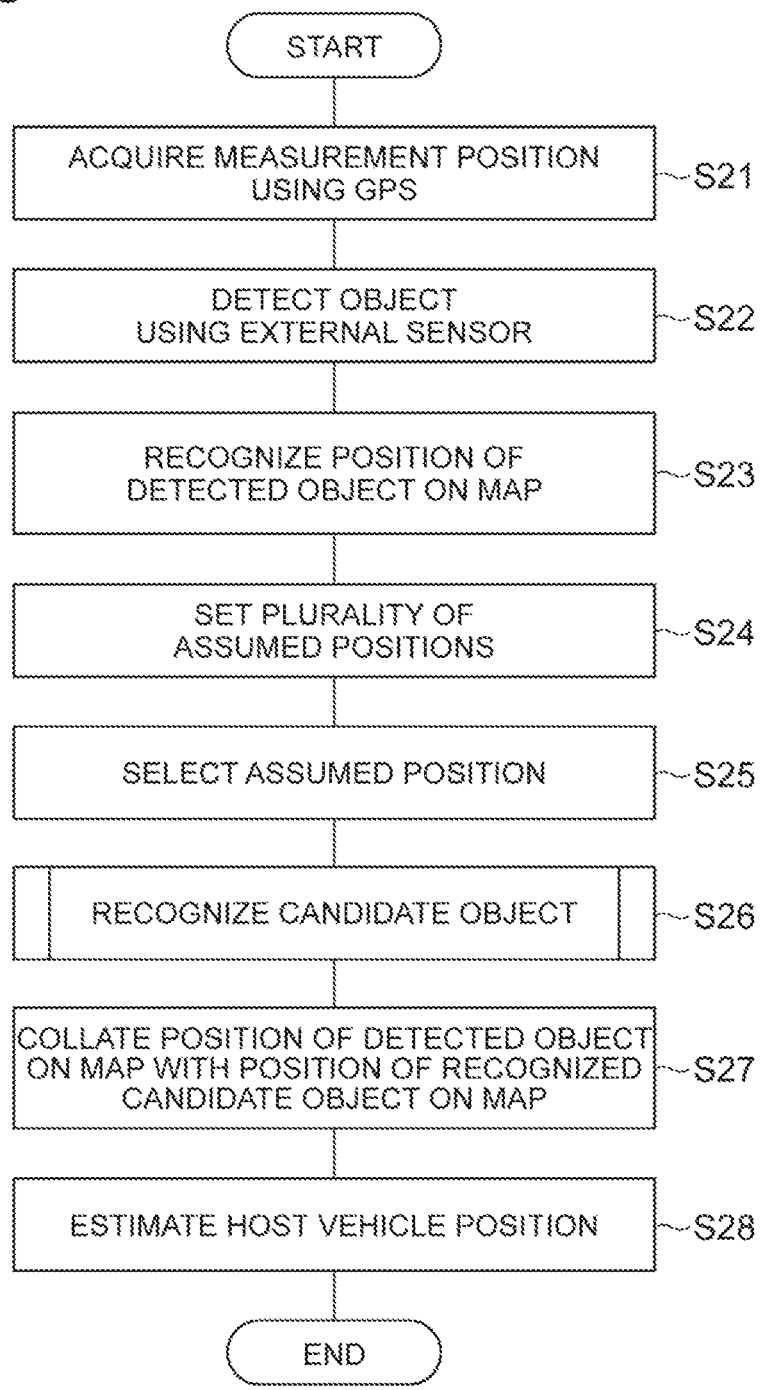
FIG. 8 is a flowchart illustrating an example of processing by a host vehicle position estimation ECU in FIG. 5.
Figure 9:
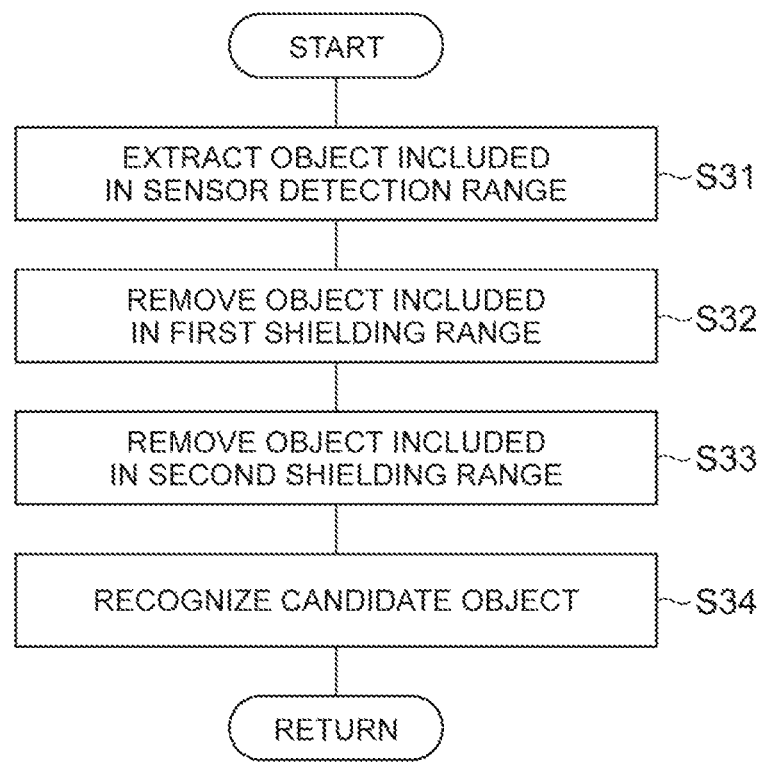
FIG. 9 is a flowchart illustrating candidate object recognition processing in FIG. 8.

Next, an example of the calculation processing by the host vehicle position estimation device 200 will be described. FIG. 8 is a diagram illustrating the processing by the host vehicle position estimation ECU 10B. FIG. 9 is a diagram illustrating candidate object recognition processing in FIG. 8. The processing items in the flowcharts illustrated in FIGS. 8 and 9 are performed, for example, while the host vehicle M is traveling.

As illustrated in FIG. 8, in S21, the host vehicle position estimation ECU 10B of the host vehicle position estimation device 200 acquires the measurement position of the host vehicle M using the measurement position acquisition unit 11. The measurement position acquisition unit 11 acquires the measurement position which is the position of the host vehicle on the map based on the information on the position of the host vehicle measured by the GPS receiver 1.

In S22, the host vehicle position estimation ECU 10B detects an object using the external sensor 2. In S23, the host vehicle position estimation ECU 10B recognizes the position of the detected object on the map using the object recognition unit 12. The object recognition unit 12 recognizes the position of the object on the map used for estimating position of the host vehicle based on the information on the position of the object detected by the external sensor 2.

In S24, the host vehicle position estimation ECU 10B sets a plurality of assumed positions using the candidate object recognition unit 13B. The candidate object recognition unit 13B sets, for example, three assumed positions around the measurement position of the host vehicle. In S25, the host vehicle position estimation ECU 10B selects an assumed position using the candidate object recognition unit 13B. The candidate object recognition unit 13B selects an assumed position that makes an error between the assumed position and the measurement position of the host vehicle be smallest, from the set plurality of assumed positions.

In S26, the host vehicle position estimation ECU 10B recognizes the candidate object using the candidate object recognition unit 13B. Specifically, the candidate object recognition unit 13B performs the processing illustrated in FIG. 9. In S31, the candidate object recognition unit 13B extracts the objects included in the sensor detection range E of the external sensor 2 from the objects of which the position on the map is recognized in S23.

In S32, the host vehicle position estimation ECU 10B removes the objects included in the first shielding range $E_{ST}$ using the candidate object recognition unit 13B. The candidate object recognition unit 13B removes the objects included in the first shielding range $E_{ST}$ from the objects extracted in S31.

In S33, the host vehicle position estimation ECU 10B removes the objects included in the second shielding range $E_{M1}$ or the second shielding range $E_{M2}$ using the candidate object recognition unit 13B. The candidate object recognition unit 13B further removes the objects included in the second shielding range $E_{M1}$ or the second shielding range $E_{M2}$ from the objects resulting from the removal of the object included in the first shielding range $E_{ST}$ in S32.

In S34, the host vehicle position estimation ECU 10B recognizes the candidate object using the candidate object recognition unit 13B. The candidate object recognition unit 13B recognizes the objects resulting from the removal of the objects included in the second shielding range $E_{M1}$ or the second shielding range $E_{M2}$ in S33, as the candidate object.

Returning to the processing in FIG. 8, in S27, the host vehicle position estimation ECU 10B collates the position of the object on the map detected by the external sensor 2 with the recognized position of the candidate object on the map, using the host vehicle position estimation unit 14. In S28, the host vehicle position estimation ECU 10B performs the estimation of the host vehicle position using the host vehicle position estimation unit 14 based on the result of collation performed in S27.

Operational Effects of Host Vehicle Position Estimation Device 200

In the host vehicle position estimation device 200 in the second embodiment described above, the object included in the detection range E of the external sensor 2 of the host vehicle is recognized as the candidate object among the objects. The host vehicle position is estimated based on the candidate object and the object detected by the external sensor 2 of the host vehicle. In this way, the estimation of the host vehicle position erroneously using an object that is not included in the detection range E of the external sensor 2 of the host vehicle can be suppressed. As a result, it is possible to improve the accuracy in estimating the host vehicle position on the map.

The host vehicle position estimation device 200 further includes a shield database 5C that stores shield information including the information on the position of the shield on the map. The candidate object recognition unit 13B recognizes the candidate object based on the measurement position of the host vehicle, the detection range of the external sensor 2, and the information on the position of the object on the map, and the shield information. According to the host vehicle position estimation device 200, the object included in the detection range of the external sensor 2 of the host vehicle among the objects is recognized as a candidate object while considering the shield information including the information on the position of the shield. In this way, the estimation of the host vehicle position erroneously using the object that cannot be detected by the external sensor 2 of the host vehicle due to the shield, can be suppressed. As a result, it is possible to improve the accuracy in estimating the host vehicle position on the map.

As described above, the embodiments of the present disclosure are described, however, the present disclosure is not limited to the above-described embodiments. The present disclosure can be implemented in various forms resulting from various modifications and improvements based on the knowledge of those who are skilled in the art in addition to or instead of the embodiments described above.

For example, in the host vehicle position estimation device 100 in the first embodiment, the recognition of the candidate object in the host vehicle position estimation device 200 in the second embodiment may be used together. In this case, the host vehicle position estimation ECU 10A of the host vehicle position estimation device 100 includes the candidate object recognition unit 13B in the host vehicle position estimation device 200, and is connected to the object database 5B and the shield database 5C. The host vehicle position estimation unit 14 of the host vehicle position estimation ECU 10A may selectively use the candidate object recognized by the candidate object recognition unit 13A or the candidate object recognized by the candidate object recognition unit 13B according to a predetermined condition. For example, if the host vehicle is traveling in a region where the position of the object on the map and the object-detectable area are not associated with each other in the object database 5A in the first embodiment, the host vehicle position estimation unit 14 can perform the estimation of the host vehicle position using the candidate object recognized by the candidate object recognition unit 13B in the second embodiment. In addition, for example, if the result of collation between the position of the candidate object on the map recognized by the candidate object recognition unit 13 B in the second embodiment and the position of the object (the candidate object) on the map detected by the external sensor 2 performed by the host vehicle position estimation unit 14 indicates that the error of the positions (deviation) between the position of the candidate object on the map and the position of the object (the candidate object) on the map is equal to or larger than a certain error value, the host vehicle position estimation unit 14 can perform the estimation of the host vehicle position using the candidate object recognized by the candidate object recognition unit 13A in the first embodiment.

The candidate object recognition unit 13B may acquire the information on the stationary obstacles based on not only the shield database 5C but also the map data relating to the stationary obstacles prepared in advance and the measurement position of the host vehicle. The map data relating to the stationary obstacles includes the information on the position of the stationary obstacles on the map. In the map data, the stationary obstacles do not have to be individually distinguished, and if the branches of the tree are in contact with the guardrails, they may be handled as a series of stationary obstacles. In addition, the candidate object recognition unit 13B may acquire the shield information on another vehicle by performing the vehicle-to-vehicle communication with the other vehicle via a communication unit (not illustrated).

The host vehicle position estimation device 200 in the second embodiment does not necessarily need to remove the object included in the second shielding range using the candidate object recognition unit 13B. In this case, the processing in S33 in FIG. 9 is omitted.

The host vehicle position estimation device 200 in the second embodiment does not necessarily need to include the shield database 5C. In this case, the processing in S32 in FIG. 9 is omitted. The removal (the processing in S33 in FIG. 9) of the object included in the second shielding range using the candidate object recognition unit 13B may or may not be performed.

In addition, the host vehicle position estimation devices 100 and 200 do not necessarily need to be mounted on the host vehicle, but may be provided in a server such as an information management center or the like. In this case, the host vehicle position estimation devices 100 and 200 can recognize the candidate object and can estimate the position of the vehicle by, for example, receiving the request for the calculation of a confidence degree from host vehicle M and various information on the host vehicle M (the measurement position of the host vehicle, the result of detection performed by the external sensor, and the like).

The host vehicle M does not necessarily need to include the autonomous driving ECU 50. The host vehicle position estimation ECUs 10A and 10B may transmit the estimated position of the host vehicle to various ECUs or the like for the controls other than the autonomous driving.

What is claimed is:

1. A host vehicle position estimation device comprising:
an external sensor mounted on a host vehicle, configured to detect objects in a surrounding environment of the host vehicle;
an object database that stores information on previously detected objects which includes: (i) a position of each of the previously detected objects on a map and (ii) an object-detectable area for each of the previously detected objects, wherein the object-detectable area is an area set in advance as an area from which the external sensor of the host vehicle can detect the previously detected objects, and wherein the object-detectable area is set as a different area for each of the previously detected objects; and
an electronic control unit (ECU), including one or more processors, programmed to:

acquire a measurement position which is the position of the host vehicle on the map, measured by a GPS receiver while the vehicle is traveling;

detect an object using the external sensor mounted on the host vehicle while the host vehicle is traveling;

recognize, from among the previously detected objects, a candidate object which is associated with the object-detectable area including the measurement position of the host vehicle, wherein the candidate object is recognized based on the object-detectable area in the information on the detected objects and the measurement position; and estimate the host vehicle position based on a comparison of a position of the candidate object on the map and a position of the detected object on the map.

2. The host vehicle position estimation device according to claim 1, wherein the objects that are stored in the object database are detected previously by an other vehicle that is not the host vehicle, and the object-detectable area is set based on a position from which the other vehicle has detected the objects previously.

3. The host vehicle position estimation device according to claim 2, wherein the other vehicle uses an external sensor having a sensor detection range that is the same as the external sensor of the host vehicle.

4. The host vehicle position estimation device according to claim 3, wherein, when, based on the comparison, a deviation between the position of the candidate object on the map and the position of the detected object on the map is larger than a predetermined threshold, change a travel plan of the host vehicle.

* * * * *